Sept. 5, 1961 E. J. RENNER 2,998,731
PULLEY HUBS
Filed May 19, 1959 3 Sheets-Sheet 2
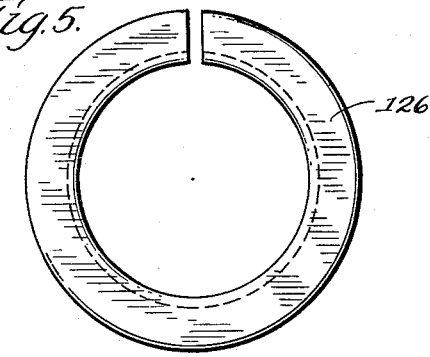
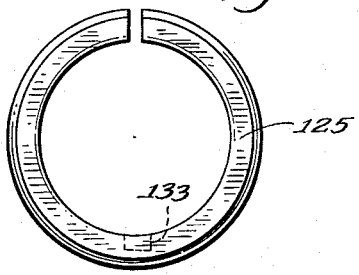
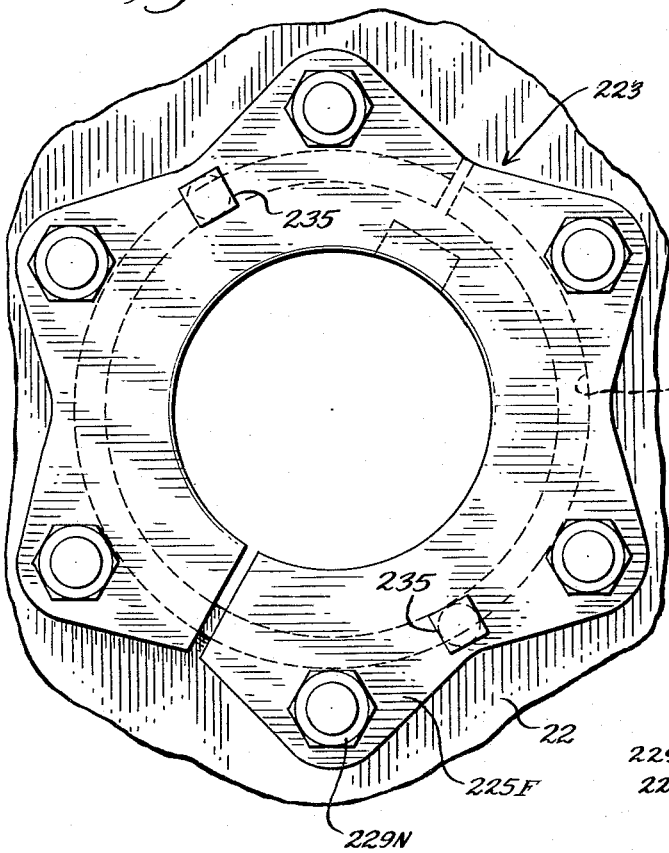
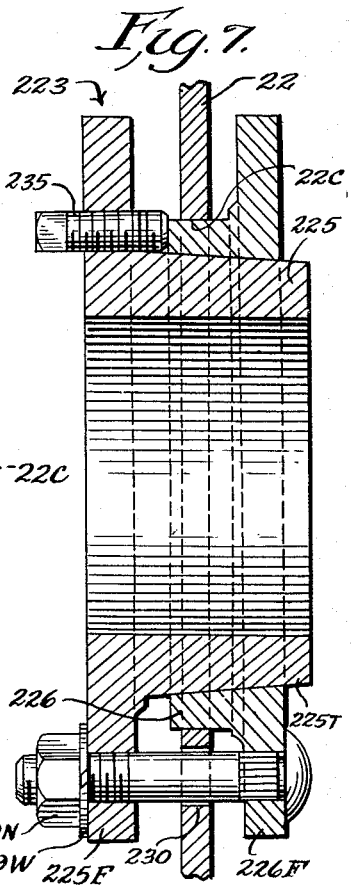
Inventor
Elmer J. Renner
By Mann, Brown and McWilliams,
Attys.

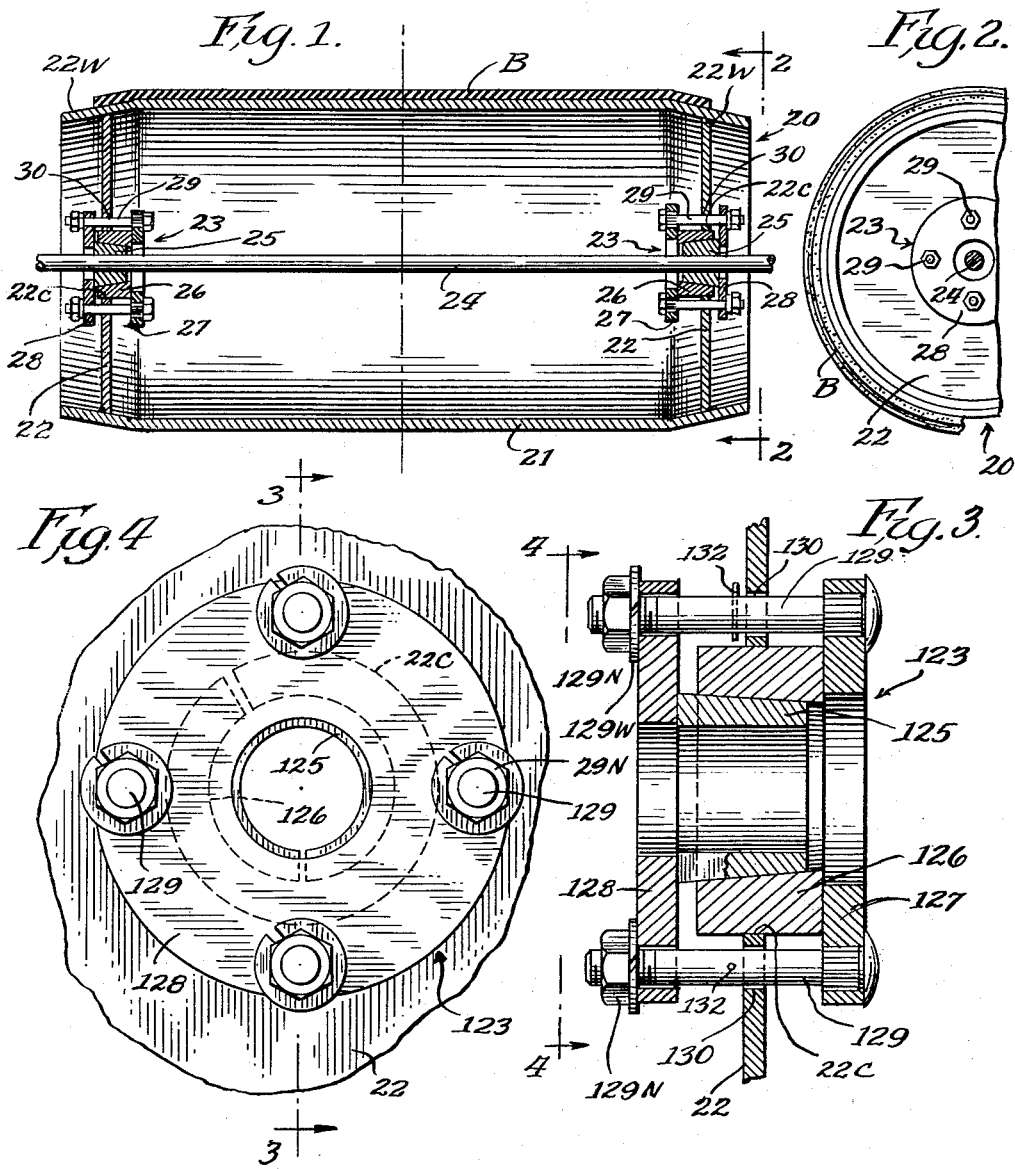

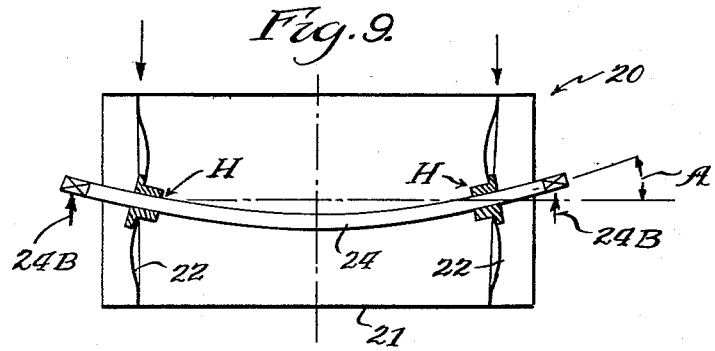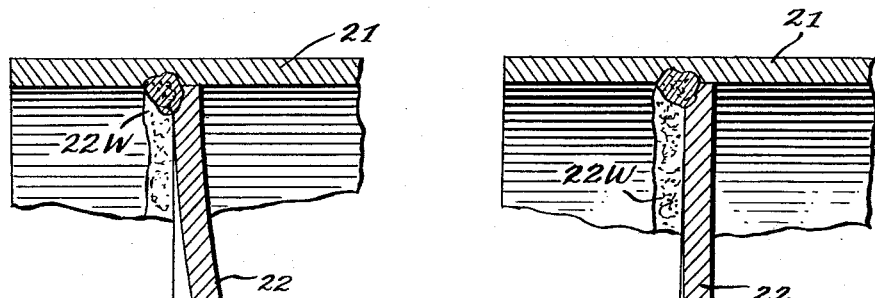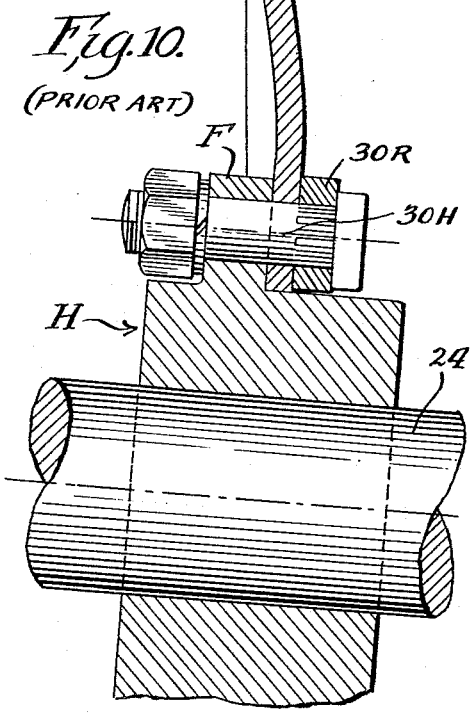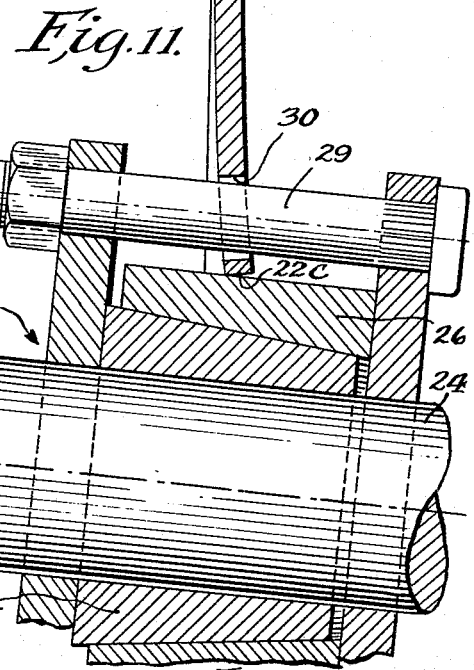

2,998,731
Patented Sept. 5, 1961

2,998,731
PULLEY HUBS
Elmer J. Renner, Aurora, Ill., assignor to Stephens-Adamson Mfg. Co., a corporation of Illinois
Filed May 19, 1959, Ser. No. 814,203
7 Claims. (Cl. 74—230.8)

This application is a continuation-in-part of my copending application Serial No. 733,139, filed May 5, 1958.

This invention relates to belt conveyors and particularly to the way in which the pulleys thereof are mounted on their supporting shafts.

In belt conveyors the supporting pulleys are usually relatively wide so that the rim of the pulley must be supported at axially spaced points on its mounted shaft, and such support is conventionally provided by end disks fixed within the rim near its ends. Such end disks conventionally have mounting hubs disposed in central or axial openings in the disks whereby the pulley may be secured in place on a mounting shaft.

In the use of belt conveyors one of the most common and costly mechanical troubles has been in the pulley structures due to failure of the end disks or mounting hub elements of the pulleys. This has resulted in the development and use of relatively elaborate and expensive mounting structures intended to transmit the radial and torque loads without undue breakage. It has been found however that, even with the best of such prior mounting structures, early and unexpected pulley failure is often encountered.

It is therefore the primary object of this invention to provide an improved mounting structure for conveyor pulleys, and an object related to the foregoing is to enable such conveyor pulleys to be mounted in a simple and effective manner which materially reduces the objectionable forces in the pulley end disks and in the mounting structure so as to assure a longer useful life for the pulley.

Other and further objects of the present invention will be apparent from the following description and claims, and are illustrated in the accompanying drawings, which, by way of illustration, show preferred embodiments of the present invention and the principles thereof, and what is now considered to be the best mode in which to apply these principles. Other embodiments of the invention embodying the same or equivalent principles may be used and structural changes may be made as desired by those skilled in the art without departing from the invention.

In the drawings:

FIG. 1 is an axial sectional view through a conveyor pulley supported in accordance with the invention;

FIG. 2 is an end elevational view taken from the line 2—2 of FIG. 1;

FIG. 3 is an enlarged fragmentary view similar to one portion of FIG. 1 and illustrating an alternative supporting structure, the view being taken on the line 3—3 of FIG. 4;

FIG. 4 is a sectional view taken along the line 4—4 of FIG. 3;

FIGS. 5 and 6 are end views of the split tapered sleeves of FIGS. 3 and 4;

FIGS. 7 and 8 are views similar to FIGS. 3 and 4 and showing another alternative embodiment of the invention;

FIGS. 9, 10 and 11 are schematic views showing the theories of operation in the prior art and in the present mounting.

For purposes of disclosure the invention is herein illustrated in FIGS. 1 and 2 as it is utilized in the mounting of a pulley 20 that forms a part of a belt conveyor and supports the conveyor belt B. The conveyor pulley 20 comprises a rim 21 having transverse disks 22 fixed therein adjacent to the ends and having axially located bearing or mounting hubs 23 located on the respective disks 22 so that the pulley 20 may be mounted on a supporting shaft 24 for rotation in its position of use. The present invention is concerned with the way in which the end disks 22 of the pulley 20 are connected to the shaft 24, and while the pulley 20 as herein shown is of the self-training structure described and claimed in my aforesaid application, such self-training structure forms no part of the present invention. The transverse end disks 22 may be in the form of sheet metal stampings, and these stampings are put in place within the rim and integrally attached, as by a weld 22W to the inner surfaces of the rim adjacent to the ends thereof.

The end disks 22 have central openings 22C formed therein in which the hubs 23 are mounted. The hub structures as shown in FIG. 1 are provided by inner and outer split tapered sleeves 25 and 26 that have radial longitudinally extended slots cut therethrough so that the sleeves may be altered as to diameter by pushing the two sleeves endwise toward each other. This is accomplished by an inside clamping plate 27 and an outside clamping plate 28 that engage the respective split sleeves so that the sleeves may be urged endwise of each other by drawing the plates together. Bolts 29 are extended loosely through appropriate openings 30 in the web 22 for accomplishing this clamping action, and when the tapered sleeves are drawn together, the outer sleeve 26 is expanded into firm contact with the central opening 22C while the inner sleeve 25 is clamped tightly on a mounting shaft.

The hub structures 23 must of course support the pulley 20 in the proper axial relation on the shaft 24 and must transmit the torque and radial loads between the shaft 24 and the rim 21, and it has been found that with the hub structures 23 of this invention such results are accomplished in such a way as to materially extend the useful life of the pulley. Such improved performance results from the way in which the hub structures 23 cooperate with the end disks 22 so as to materially reduce working stresses that normally tend to cause failure of such end disks in conveyor pulleys.

Thus, it is well known that when radial load is placed on conveyor pulleys of the aforesaid kind, appreciable bending or deflection of the pulley supporting shaft is induced, and in FIGS. 9 and 10 of the drawings this objectionable operating condition has been illustrated in an exaggerated manner as it occurs in prior art conveyor pulley mountings, while in FIG. 11 the improved action of the present mounting has been illustrated for specific comparison with the prior art structure of FIG. 10. In FIG. 9 a conveyor pulley 20 with a rim 21 and end disks is illustrated as being mounted by prior art hubs H on a shaft 24 which is supported as at 24B by self-aligning bearings according to usual practice.

Such a conveyor pulley shaft selected according to conventional standards operates under the usual radial load in a downwardly bowed or deflected form that has been illustrated in an exaggerated manner in FIG. 9, and this deflection causes the end portions of the shaft to slope slightly in an upward direction. The angle A of such upward slope of the end portions of the shaft 24 is, in a sense rather slight, and in practice, slope or deflection angles of about eight minutes, measured at the end disks 22 of the pulley, are fairly common.

Such deflection of the pulley supporting shaft 24 is the normal and expected thing in conveyors and is taken into account in the selection of the shaft sizes so that the shaft may operate safely in its bowed or deflected condition. As to the end disks 22, however, the rotation of the bowed supporting shaft 24 has produced repeated reverse bending and overstressing of the end disks 22 as diagrammatically illustrated in FIG. 9 with resulting early failure of the end disks. Thus, as shown in FIG. 9, the end disks 22, in the vertical plane of the shaft 24, assume a somewhat flat S-curved form, and as the shaft and pulley rotate, this form in effect progresses about the axis of the pulley and as to any diametric portion of the disk, the curved form is reversed twice in each shaft revolution. The magnitude or severity of the curve and the resulting stresses in the metal of the end disks vary, of course, with the magnitude of the angle A.

As shown in FIGS. 9 and 10, each prior art hub H has an outward radial flange F engaged with the outer face of the end disk 22 and clamped to the disk by bolts 30H that extend from an inner clamping ring 30R and through the end disk 22. Thus, the radially inner portion of the disk 22 is maintained at all times in a plane perpendicular to the axis of the hub H which is in turn parallel to the sloping axis of the shaft, and as a result the distortion or flexing of the end disk 22 must take place radially outwardly of the flange F.

With the mounting hub structure 23 of the present invention the deflection of the shaft 24 also causes flexing of the end disk 22, but such flexing is of different type or character, and for any particular deflection angle A, is substantially less severe, as will be evident from a comparison of the structures shown in FIGS. 10 and 11. Thus, in the hub structure 23 shown in FIG. 11, the only physical contact between the disk 22 and the hub structure is located at the edge defining the opening 22C where this edge bears against the outer split ring 26, and it is at this location that the maximum flexure or displacement takes place. It is important to note such displacement is substantially less than the maximum displacement that takes place with the prior art structure of FIG. 10. Moreover, the different bending or flexing action attained under the present invention results in an extremely great reduction in the tensile and compressive forces involved in such flexure as compared with the prior art structure of FIG. 10. Thus as shown in FIG. 11, the end disk 22 is flexed in a single simple curve above the hub 23 and in a similar but reversely disposed simple curve below the hub, and this simple curve has a relatively large effective radius. In contrast, the flexed portion of the end disk 22 as shown in the prior art structure of FIG. 10 is formed as a reverse or compound curve, each portion of which has an effective radius that is but a fraction of the effective flexing radius shown in FIG. 11, so that for any particular angle of shaft deflection, the tensile and compressive forces produced in the disk 22 with the prior art structure of FIG. 10 are much greater than with the hub structure of the present invention.

In FIG. 11 it will be observed that the opposed faces of the opening 22C and the sleeve 26 have a relative tilting movement in the course of the flexure of the end disk 22, and while this was initially considered to constitute a possible source of trouble because of the compressive deflection or penning action on the sleeve 26, it has been found in practice that within the normal range of deflection angles, end disk thickness and sleeve sizes there is no appreciable peening action that might cause failure.

As a demonstration of the improved performance attained under this invention, it was found that with a deflection angle A of eight minutes, a pulley supported as shown in FIG 10 failed in its end disks 22 at five million revolutions, while a pulley supported as shown in FIG. 11, with a materially larger deflection angle A of twenty-five minutes, showed no indications of potential failure after the same number of revolutions.

In FIGS. 3 to 6 of the drawings a mounting hub structure 123 is shown that is similar to the hubs 23. The hub structure 123 has inner and outer split tapered sleeves 125 and 126 with the outer sleeve disposed in and extending through the central opening 22C of the end disk 22 of a conveyor pulley. An inside clamping ring or plate 127 engages the inner end of the sleeve 126 while an outside clamping ring or plate 128 engages the outer end of the sleeve 125. A plurality of clamping bolts 129 extend through the inside clamping plate 127 in a fixed and splined relation, and these bolts 129 extend loosely through clearance openings 130 in the end disk 22. The outer ends of the bolts 129 extend through the outside plate 128 and have nuts 129N and lock washers 129W thereon so that the tapered split sleeves 125 and 126 may be drawn together in an endwise sense to expand the sleeve 126 into firm gripping contact with the opening 22C and clamp the sleeve 125 firmly onto a supporting shaft. The bolts 129 have cross pins 132 therein outside of the end disk 22 so as to hold the parts in position during manufacture, shipment and assembly on a pulley shaft. In FIG. 6, the inner sleeve 125 has a keyway 133 indicated in dotted outline, but as a practical matter it has been found that keying to the shaft is not required in most instances.

The mounting structures thus far described are used where the shaft diameter is between one inch and about two and three quarters inches, and where larger shaft sizes are encountered I prefer to employ a mounting structure such as that shown in FIGS. 7 and 8 of the drawings wherein the invention is shown as embodied in a mounting hub structure 223. In this embodiment of the invention an inner split sleeve 225 has an integral split clamping flange 225F at its outside end and has the outer surface of the sleeve tapered as at 225T from a larger diameter near the flange to a smaller diameter at its inside end. An outer split sleeve 226 surrounds and has a complemental engagement with the tapered surface 225T and at its inside end the sleeve 226 has an integral split clamping flange 226F. The inner sleeve 225 is adapted to embrace and be clamped onto a supporting shaft, while the sleeve 226 extends through the central opening 22C of an end disk of the pulley, and by expanding the sleeve 226 the hub structure is fixed in its driving relation to the end disk 22.

The inner sleeve 225 and its flange are preferably formed as in iron casting that is machined to the desired form, while the outer sleeve 226 and its flange are formed as a steel casting which is thereafter machined as required. Bolts 229 extend in fixed and splined relation through the flange 226F and outwardly through oversize clearance openings 230 in the disk 22 and through the flange 225F to receive washers 229W and clamping nuts 229N. A pair of square headed, cup end screws 235 are mounted in the flange 225F at diametric points as shown in FIG. 8 so that the inner ends thereof engage the outer end of the sleeve 226. The screws 235 may thus be used to separate the sleeves 225 and 226 in an endwise direction when the pulley is to be removed from its mounting shaft.

From the foregoing description it will be apparent that the present invention provides an improved mounting structure for conveyor pulleys, and it will also be apparent that the mounting hub structure that is provided under the present invention enables conveyor pulleys to be mounted in a simple and effective manner that results in the attainment of a longer useful life.

Thus, while preferred embodiments of the invention have been illustrated herein, it is to be understood that changes and variations may be made by those skilled in the art without departing from the spirit and scope of the appending claims.

I claim:
1. In a conveyor pulley, a substantially cylindrical rim, a pair of resilient, metallic end disks integrally attached peripherally to said rim near the ends thereof and having central mounting openings each defined by an inwardly facing edge wall, a supporting shaft extending axially through said openings and having such cross-sectional dimension and resiliency that when mounted in bearings outboard of the disks the shaft experiences substantial deflection between said end disks under heavy pulley loads, and means for securing each of said end disks to the shaft solely by radial frictional pressure exerted between the shaft and said edge walls of the disk, said disks being unrestrained in the area between their peripheral attachment to the rim and their pressure securement to the shaft whereby destructive flexing of the end disks due to shaft deflection is substantially avoided.

2. In a conveyor pulley, a substantially cylindrical rim, a pair of resilient, metallic end disks integrally attached peripherally to said rim near the ends thereof and having central mounting openings each defined by an inwardly facing edge wall, a supporting shaft extending axially through said openings and having such cross-sectional dimension and resiliency that when mounted in bearings outboard of the disks the shaft experiences substantial deflection between said end disks under heavy pulley loads, and means for securing said end disks to the shaft including expansible supporting hubs rotating with the shaft and expanded radially outwardly in the respective mounting openings to support and rotate the end disks with the shaft solely by frictional radial contact with said edge walls, said disks being unrestrained in the area between their peripheral attachment to the rim and their pressure securement to the shaft whereby destructive flexing of the end disks due to shaft deflection is substantially avoided.

3. In a conveyor pulley, a substantially cylindrical rim, a pair of resilient, metallic end disks integrally attached peripherally to said rim near the ends thereof and having central mounting openings each defined by an inwardly facing edge wall, a supporting shaft extending axially through said openings and having such cross-sectional dimension and resiliency that when mounted in bearings outboard of the disks the shaft experiences substantial deflection between said end disks under heavy pulley loads, and means for securing each of said end disks to the shaft solely by radial frictional pressure exerted between the shaft and said edge walls of the disks, said means including inner and outer split tapered sleeves disposed in cooperating relation in each of said central mounting openings, and clamping means associated with each of said hubs and free of contact with said end disks operable to move the cooperating sleeves endwise with respect to each other to expand and clamp the outer sleeve against the edge wall of the mounting opening of the respective disks and to clamp the inner sleeve on said shaft, said disks being unrestrained in the area between their peripheral attachment to the rim and their pressure securement to the shaft whereby destructive flexing of the end disks due to shaft deflection is substantially avoided.

4. A conveyor pulley as set forth in claim 1 in which said means comprises mounting hubs for the respective end disks, each comprising inner and outer split tapered sleeves disposed in cooperating relation in one of the central mounting openings, and clamping means operable to move the cooperating sleeves endwise with respect to each other to expand and clamp the outer sleeve against the mounting opening of the respective disks and to clamp the inner sleeve on said shaft, said clamping means including bolts passing through enlarged openings in the end disks and out of contact with the walls of said openings, whereby flexing of the end disks due to shaft deflection is not restrained by said bolts.

5. A conveyor pulley as set forth in claim 4 in which said clamping means includes vertical flanges on opposed outer ends of said sleeves and through which said bolts pass.

6. A conveyor pulley as set forth in claim 5 in which screw means are provided for forcing said sleeves apart when the hubs are to be removed from the pulley.

7. A conveyor pulley as set forth in claim 4 in which said clamping means includes also clamping plates flanking the inner and outer sleeves.

References Cited in the file of this patent
UNITED STATES PATENTS

| | | |
|---|---|---|
| 308,639 | Stevens | Dec. 2, 1884 |
| 733,408 | Mack | July 14, 1903 |
| 827,346 | Bubb | July 31, 1906 |
| 1,371,828 | Walbert | Mar. 15, 1921 |
| 2,524,027 | Blackmarr | Oct. 3, 1950 |
| 2,691,541 | Benedek | Oct. 12, 1954 |
| 2,749,157 | Dennison | June 5, 1956 |
| 2,816,452 | McCloskey | Dec. 17, 1957 |